UNITED STATES PATENT OFFICE.

HENRY BLUMENBERG, JR., OF ORO GRANDE, CALIFORNIA.

PROCESS OF TREATING CEMENT MIXTURES FOR THE RECOVERY OF POTASSIUM COMPOUNDS.

1,296,464.     Specification of Letters Patent.     Patented Mar. 4, 1919.

No Drawing.     Application filed March 15, 1918. Serial No. 222,769.

*To all whom it may concern:*

Be it known that I, HENRY BLUMENBERG, Jr., a citizen of the United States, residing at Oro Grande, in the county of San Bernardino and State of California, have invented new and useful Improvements in Processes of Treating Cement Mixtures for the Recovery of Potassium Compounds, of which the following is a specification.

My invention relates to a process of recovering potassium compounds carried by the hot waste gases of cement kilns, metallurgical furnaces and the like.

In the recovery of potassium compounds as a by-product of cement kilns, a potassium containing mineral such as feldspar, shale and the like is used as one of the raw materials in the manufacture of cement. The high temperature of the cement kiln volatilizes the potassium compounds, mostly in the form of potassium oxid $K_2O$, which in conjunction with cement dust and products of combustion is carried by the hot gases which are treated in a suitable apparatus for precipitating and recovering the solid matter carried therein. The potassium may be recovered in the form of a potassium salt such as sulfate chlorid, nitrate, or carbonate, depending on the re-agent used in treating the hot gases.

It is the principal object of this invention to treat the raw cement material or mix as it is called to increase the volatility of the potassium contained in the mix. It has been suggested to add re-agents such as sodium chlorid, calcium chlorid, calcium fluorid, sulfur dioxid, steam and the like with the mix to increase the volatility of the potassium compound. While a measure of success has attended the use of such re-agents, I have discovered that by using a small amount of a metal nitrate with the mix, I not only increase the volatility of the potassium compound therein, but the nitrogen oxid generated is utilized and recovered in the subsequent precipitation of the potassium oxid carried by the hot gases in the form of potassium nitrate, which is an excellent fertilizer.

My invention consists in the steps of the process hereinafter described and claimed.

To the cement mix comprising a potassium containing mineral such as shale, I add one to two per cent. of sodium nitrate. In place of sodium nitrate, any other metal nitrate may be used. The volatility of the potassium compounds is increased approximately 10% of the recovery, when a cement mix is used, without the addition of sodium nitrate.

The waste gases carrying cement dust, products of combustion and potassium compounds, are led to a cooling chamber where a large portion of their waste heat is given off and utilized for heating and concentrating the slurry or magma containing the recovered potassium compounds. In my co-pending application for a process of recovering potassium and apparatus therefor, Serial No. 214212, filed January 28th, 1918, I have described a process and apparatus for recovering potassium carried in hot gases. The cooling of the gases decreases their volume and checks their velocity, thereby causing a large portion of the dust to be deposited. The cooled gases are then caused to pass through a precipitating chamber where they come in contact with the fine spray of a liquid re-agent which may be calcium sulfate, calcium chlorid, sodium nitrate and the like, which recovers the potassium compounds, which may be, after concentration, easily separated by filtration from the insoluble calcium carbonate and the like, or the concentrated and dried slurry or magma containing the potassium compounds may be used as a fertilizer without any previous separation of the potassium compounds from the other solids.

I claim:

1. A process of treating cement mix to increase the volatility of the potassium compounds contained therein, comprising adding a small percentage of a metal nitrate.

2. A process of treating cement mix to increase the volatility of the potassium compounds contained therein, comprising adding a small percentage of sodium nitrate.

3. A process of treating cement mix to increase the volatility of the potassium compounds contained therein, comprising adding one to two per cent. of sodium nitrate.

In testimony whereof I have signed my name to this specification.

HENRY BLUMENBERG, JR.